(12) United States Patent
Fiaschi et al.

(10) Patent No.: US 7,990,876 B2
(45) Date of Patent: Aug. 2, 2011

(54) METHOD FOR SELECTION OF A STRATEGY FOR RE-ROUTING OF CIRCUITS IN A COMMUNICATION NETWORK AND NETWORK WITH SAID METHOD

(75) Inventors: Giovanni Fiaschi, Genoa (IT);
Francesco Lazzeri, Riva Trigoso (IT);
Piergiorgio Sessarego, Genoa (IT)

(73) Assignee: Ericsson AB, Stockholm (SE)

( * ) Notice: Subject to any disclaimer, the term of this patent is extended or adjusted under 35 U.S.C. 154(b) by 831 days.

(21) Appl. No.: 10/597,229

(22) PCT Filed: Jan. 11, 2005

(86) PCT No.: PCT/EP2005/050089
§ 371 (c)(1),
(2), (4) Date: Nov. 28, 2007

(87) PCT Pub. No.: WO2005/069555
PCT Pub. Date: Jul. 28, 2005

(65) Prior Publication Data
US 2011/0069703 A1    Mar. 24, 2011

(30) Foreign Application Priority Data
Jan. 16, 2004   (IT) .............................. MI2004A0052

(51) Int. Cl.
*H04L 12/26* (2006.01)
(52) U.S. Cl. ........................................ 370/238; 370/252
(58) Field of Classification Search ........................ None
See application file for complete search history.

(56) References Cited

U.S. PATENT DOCUMENTS

| | | | | |
|---|---|---|---|---|
| 5,459,716 A * | 10/1995 | Fahim et al. | .................. | 370/228 |
| 5,787,271 A * | 7/1998 | Box et al. | ........................... | 714/4 |
| 5,838,660 A * | 11/1998 | Croslin | ........................ | 370/216 |
| 5,883,881 A * | 3/1999 | Croslin | ........................ | 370/221 |
| 6,236,642 B1 * | 5/2001 | Shaffer et al. | ................. | 370/237 |
| 6,744,727 B2 * | 6/2004 | Liu et al. | ........................ | 370/228 |
| 7,433,315 B2 * | 10/2008 | Bhatia et al. | .................. | 370/237 |
| 2003/0179716 A1 | 9/2003 | Liu | | |
| 2004/0083277 A1 * | 4/2004 | Chaporkar et al. | ........... | 709/220 |

FOREIGN PATENT DOCUMENTS

| | | |
|---|---|---|
| EP | 1 341 393 | 9/2003 |
| WO | WO 2004/036814 | 4/2004 |

* cited by examiner

*Primary Examiner* — Steven H Nguyen
(74) *Attorney, Agent, or Firm* — Coats & Bennett, P.L.L.C.

(57) ABSTRACT

A method is described for identification in a communication network of a sequence of circuit movement steps therein to change with the movement of a single circuit at a time from an initial routing in which are satisfied a certain number of service demands to a feasible target routing that satisfies the same service demands with better utilization of the network resources and that is identified as the one which best approximates or identifies a new predetermined desired target routing. In accordance with the method the steps are made of calculating for each demand still to be processed a replacement circuit reducing the cost difference with the circuit that satisfies the same demand in the desired target routing, choosing from among all the calculated replacement circuits the one having less cost and replacing it, marking the corresponding demand as processed, and repeating the steps from the beginning until all the demands have been processed. Then the sequence with which the circuits were replaced is used as a sequence of steps in moving of circuits for re-routing the network.

10 Claims, 5 Drawing Sheets

METHOD FOR SELECTION OF A STRATEGY FOR RE-ROUTING OF CIRCUITS IN A COMMUNICATION NETWORK AND NETWORK WITH SAID METHOD

The present invention relates to a method for selection of a strategy for re-routing of circuits in a network.

When a connectivity service is required on a transmission network the network resources are allocated with an optimization criterion chosen on the basis of various parameters.

Allocation of resources is commonly called 'circuit routing'.

Although in the allocation of resources the optimum is required to supply the required services in a data transport network (mainly in terms of band consumption but also with reference to other parameters), in the long term these resources tend for various reasons to be used in a more or less inefficient manner. In other words, during the life of a network many variable circumstances can alter the parameters of choice so that the routing is no longer optimal or, at the worst, can become no longer acceptable. Examples of reasons which might make the routing no longer satisfactory as when it was calculated can be various, such as:

- Some circuits were allocated first and, because of this, other subsequent circuits were necessarily routed in a not optimal manner on the remaining resources and then the first series of circuits is cancelled so that the not-optimal circuits on the remaining resources could have room for improvement. In a more complicated manner, this is what happens regularly when a network is made to operate for a long time;
- New network resources (nodes and fibers) are installed after many circuits are routed and these circuits could also be improved by using the available resources;
- Some resources need to be freed for maintenance reasons; and
- New routing algorithms are developed while optimizing them with different criteria.

The change in conditions can require rerouting of a large number of circuits.

Now the simplest answer for overall rerouting of the circuits could be to cancel everything and reconfigure the network from zero. Unfortunately, such a procedure would imply a long period out of commission for a large series of circuits. Furthermore, there is a not negligible risk that something might go wrong during the rerouting step and in this case an unpredictable out-of-commission situation could involve many circuits.

In a certain sense, this is the same problem found with files memorized on a hard disk; after a certain time the files on the hard disk tend to become badly fragmented and, to return to better efficiency, a defragmentation operation is necessary and could be long and not without risks.

Defragmentation in a telecommunications network can be more difficult to realize than on a hard disk since the network transports important services for a large number of customers who would not accept an interruption of the service during defragmentation.

One solution to the problem could be to move one circuit at a time so as to minimize the risks and out-of-commission periods in the network. Although this has been proposed theoretically, the problem of applying this solution practically remains unsolved because a new theoretically calculated routing cannot always be obtained in reality. Indeed, the circuits allocated can obstruct each other and not leave enough space for handling. In this case there could even be some movement sequences allowing the right movement as in a game of patience but the problem is to identify them. At the worst, it could also happen that there may not be any sequence allowing the new routing exactly as calculated.

The general purpose of the present invention is to remedy the above mentioned shortcomings by making available a method for comparing the allocation of resources and services on a network with a desired new allocation, estimating the feasibility of the desired allocation, calculating a feasible allocation which would best approximate the one desired and reorganizing the new routings calculated to arrange them in an order allowing moving the circuits one at a time to limit the risks and minimize the traffic interruptions. In other words, the purpose of the present invention, given an old and a new routing, is to provide a procedure for finding a feasible routing which would best approximate the new routing and a feasible order for moving the circuits one at a time from the old routing to the new feasible routing.

But the present invention is not addressed to how to calculate the desired routing (which can still be calculated by any known method) and assumes that the new desired routing is already known and calculated with any criterion or even designed manually.

The present invention is quite applicable to networks using protection diagrams similar to the well known 50 msec SNCP for SDH networks. In this case, indeed, the out-of-commission time of each circuit because of its movement is equal to only the protection circuit intervention time.

In view of this purpose it was sought to provide in accordance with the present invention a method for identification of a sequence of circuit movement steps in a communication network for re-routing of the network to change with the movement of a single circuit at a time from an initial routing made up of a series of n circuits $CA_i$ which satisfy corresponding demands $R_i$ (with i=1, . . . , n) to a feasible target routing made up of a new series of circuits $CI_i$ which continue to satisfy the demands $R_i$ and which is identified as the one which best approximates or identifies a desired target routing and which is made up of a series of n circuits $CT_i$ which still satisfy the demands $R_i$ (with i=1, . . . , n) and with the method comprising the steps, starting from a feasible routing which is set to be equal to the initial routing, of:

(a) Calculating for each demand $R_i$ still to be processed a replacement circuit $CI_i$ which would reduce the cost difference with the circuit $CT_i$, would satisfy the demand $R_i$ and is in the desired target routing;

(b) Choosing from among all the replacement circuits $CI_i$ calculate under step (a) the one which has least cost and replacing with it the circuit which satisfies the corresponding demand $R_i$ in the present feasible routing;

(c) Marking as processed the corresponding demand $R_i$ which is satisfied by the replaced circuit $CI_i$;

(d) Repeating steps (a) to (c) until all the demands $R_i$ have been processed; and (e) Taking as the sequence of steps for re-routing the network the sequence with which the circuits in the feasible routing have been replaced until the feasible target routing is achieved.

To clarify the explanation of the innovative principles of the present invention and its advantages compared with the prior art there is described below with the aid of the annexed drawings a possible embodiment thereof by way of non-limiting example applying said principles. In the drawings.

Figure 1:
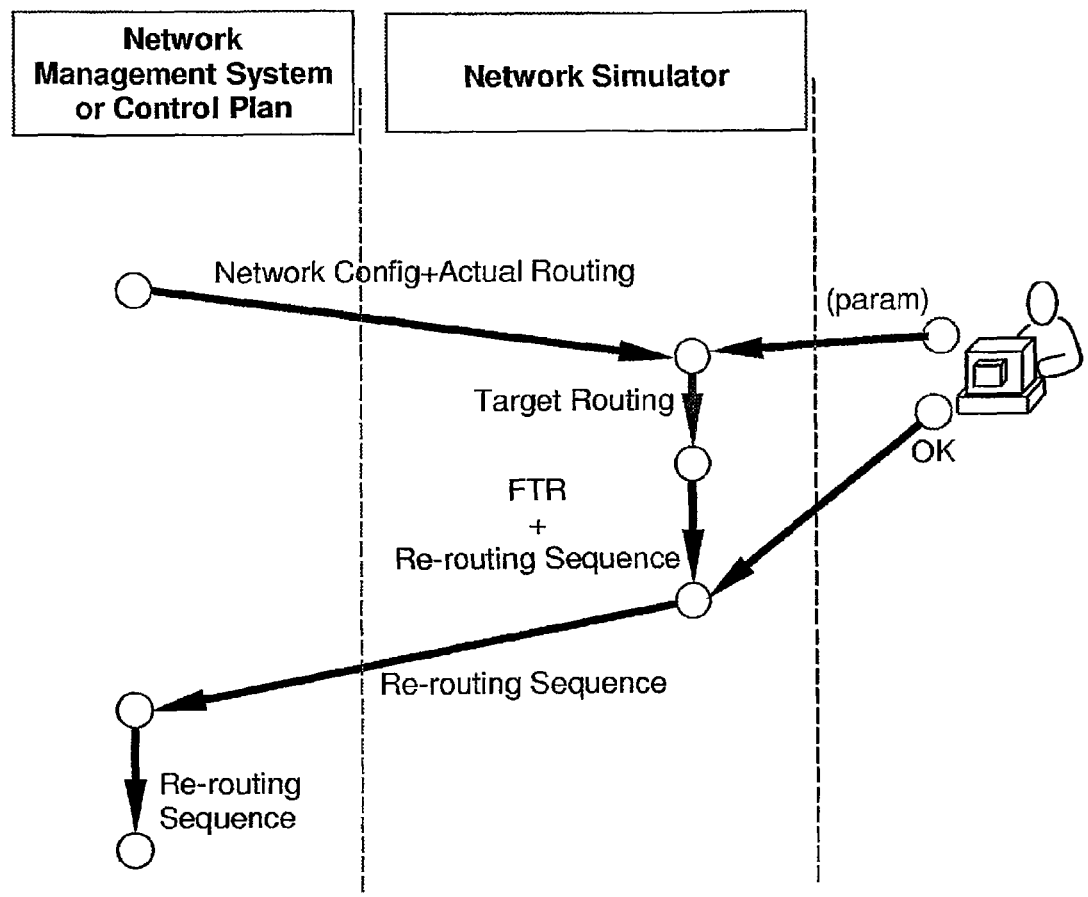
FIG. 1 shows an overall view of the re-routing process of a network applying the method of the present invention.

With reference to the figures, FIG. 1 shows diagrammatically the overall view of a network re-routing process. When re-routing is desired (the decision on this is beyond the purposes of the present invention) the 'Network Management System' or 'Control Plan' of the network sends to the Network Simulator the 'Network Config' updating and the 'Actual Routing' i.e. the routing in use in the network at the time. If necessary, other input parameters ('param') provided by a human operator also reach the simulator. By applying known methods and procedures not described in detail, the simulator calculates the 'target routing' i.e. the routing that would be desired to optimize the network in accordance with the predetermined parameters.

At this point the method of the present invention is applied and, starting from the actual routing and desired routing, provides a feasible target routing (FTR) which best approximates the desired target routing and a re-routing sequence permitting achievement thereof by moving a single circuit at a time.

In accordance with another view, a sequence of routings is thus defined starting from the actual routing and reaches the feasible target routing with each routing in the sequence differentiated by a single circuit from the routing which precedes it and follows it in the sequence.

If required, after the new network configure has been accepted by the operator the re-routing sequence is sent to the network manager who will implement it to realize the safe re-routing of the network.

The method in accordance with the present invention allows obtaining first of all the best feasible series of routing circuits i.e. obtaining the desired target routing if possible or the best approximation of the target routing it is possible to obtain with the available resources. The method also permits obtaining the best order of replacement of the circuits i.e. the order permitting allocation of the above-mentioned series of circuits while avoiding collisions.

To be able to define which would be the better of two circuits that satisfy the same requirement, a 'cost' definition of a circuit is used. In accordance with a representation well known to those skilled in the art the network can be represented by a graph with nodes connected together by means of links. With each link are associated parameters that define the cost of use of that link. These parameters are not described in detail as they depend on the routing criterion it is wished to apply and not on the method in accordance with the present invention which can be applied to any routing criterion as mentioned above.

It should also be considered that the assignment of cost parameters to the links of a graph representing a network is a procedure well known to those skilled in the art and needs no further explanation. The only assumption made here for the sake of simplicity is that the chosen routing algorithm, whatever it might be, will use a cost function that assigns to each specific routing circuit a single cost. For example, if, as usual, a cost is given to each link, the cost of the circuit can be the sum of the costs of the links it traverses.

Since it is a requirement of the network to satisfy a series of services, a traffic matrix is also defined. As well known to those skilled in the art, this matrix is a series of demands $R_i$ that indicate source, destination and characteristics of the traffic. For the sake of simplicity, the traffic matrix is considered unvarying in this procedure.

A series of circuits that satisfy the traffic matrix is called a 'routing' with the circuit $C_{i\text{-}th}$ satisfying the demand $R_{i\text{-}th}$ with i=1, ... n.

The series of all the $CA_i$ (i=1, ... , n) circuits already existing on the network is the 'actual routing' i.e. the routing in use in the network at the time.

The desired new routing i.e. the 'target routing' will have circuits $CT_i$ that also satisfy the $R_i$ demands. As mentioned above, the target routing is calculated off-line by a simulator in accordance with well-known procedures that will not be described in detail. Differently from prior art methods, the feasible target routing need not be really obtainable here.

'Feasible routing' is defined here as that routing that satisfies the traffic matrix and can be obtained from the actual routing (or, as seen below, from another feasible routing) by moving one circuit at a time with the available network resources.

The cost difference between circuits A and B is the cost of the circuit part A that is not superimposed on circuit B. This cost is used to evaluate how best a circuit approximates another. It is clear that the cost is always non-negative and that the cost difference between two identical circuits is zero.

If circuit B is part of the target routing and circuit A is part of a feasible routing and A and B satisfy the same demand $R_i$ in the traffic matrix, account will be taken only of the resources used by A and not by B. No discount is granted for non-use of B resources.

Given a feasible routing G and a target routing, we define best circuit as the circuit offering the best satisfaction of the demand $R_i$ in G, i (designated briefly by bs(i,G), from the initials of 'best satisfaction') the circuit which simultaneously:

(a) Satisfies the demand $R_i$;
(b) Can be allocated together with all the circuits of G already existing and associated with the other demands; and
(c) Minimizes the cost difference with the optimal circuit $CT_i$, i.e. a corresponding circuit of the target routing.

A feasible routing can be obtained by moving one circuit at a time onto another feasible routing.

Briefly, the method in accordance with the present invention calls for realizing a series of movements starting from the actual routing through a series of feasible routings towards the target routing and stopping when all the demands $R_i$ have been considered. The choice of the best move, which is the move permitting the best approximation of the target routing for a specific demand, is done by minimizing the cost of the associated circuits.

Figure 2:
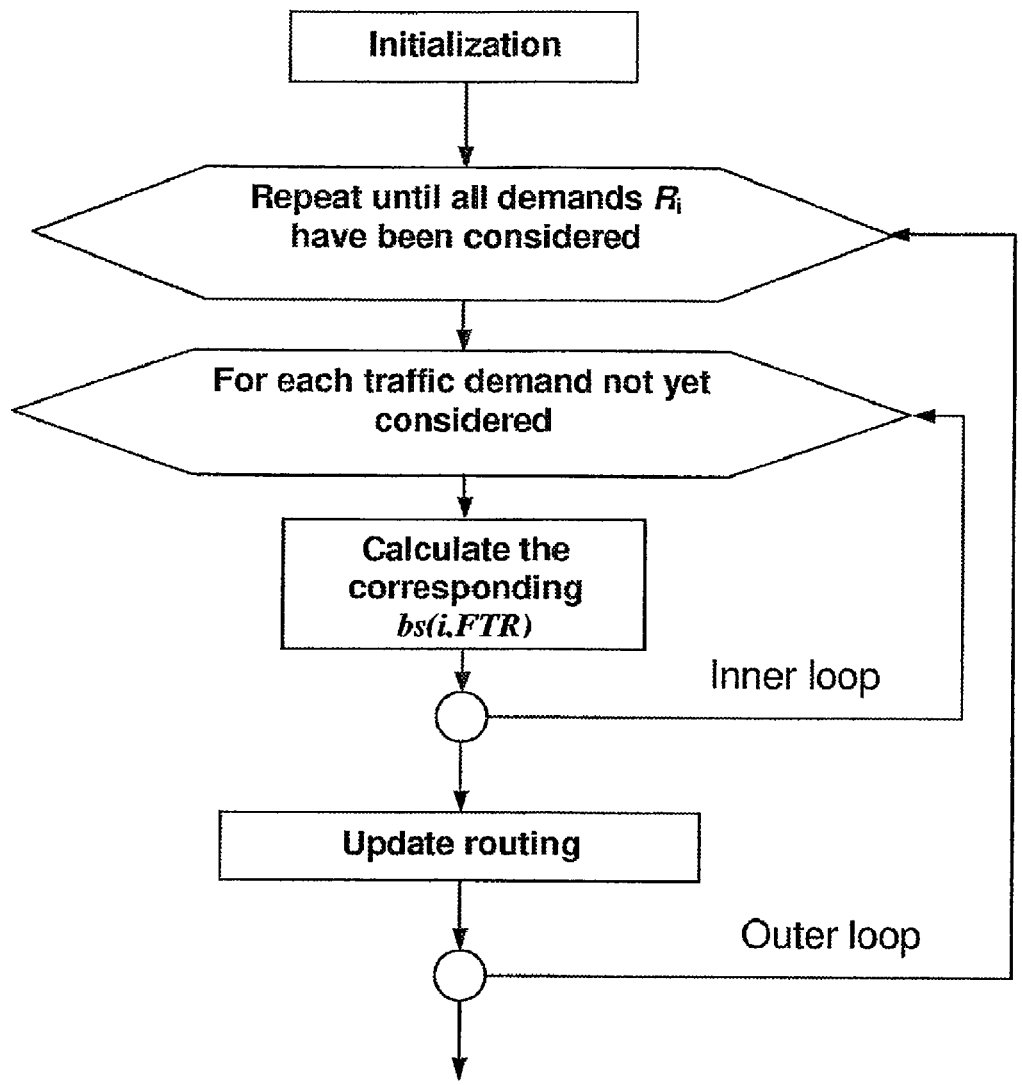
FIG. 2 shows a flow chart of the method of the present invention.

FIG. 2 shows a possible flow chart of the method. To implement the method, two iterative processings nested one in the other are realized. The inner iteration finds the best circuit to modify (i.e. the best transition between a feasible routing and another feasible routing to the desired target routing by moving a single circuit). In greater detail, the inner iteration removes one circuit at a time and tries to replace it with the corresponding circuit in the target routing. This is done by means of the search for the least cost path where the cost is the difference from the circuit in the target routing. In this manner, a solution is always available since even in case of lack of resources, at the worst the resources used for the removed circuits are made available. The circuit chosen will be the one using resources of lesser cost in addition to those used by the circuit in the target routing.

But the outer iteration moves a circuit at a time and repeats the inner iteration until all the circuits have been processed.

A pseudo code implementing the flow chart in accordance with the method might be the following:
Initialization
    Set FTR on actual routing
    Mark all the demands of the traffic matrix as not processed
    Declare a sequence of empty re-routing Interaction
    Repeat
        Repeat
            Calculates bs(i,FTR): in the FTR routing, removes the circuit $CI_i$ that satisfies $R_i$ and then calculates for $R_i$ the circuit with minimal cost difference from $CT_i$;
        Until all the $R_i$ demands not yet processed have been considered
        Seeks the demand or series of demands $\{R_i\}$ having minimal cost difference
bs(i,FTR)–$CT_i$
        For these demands $\{R_i\}$:
        Replace with bs(i,FTR) in FTR
        Suspend the circuit bs(i,FTR) from the re-routing sequence
        Mark the demand $R_i$ as processed
        Until all the demands $R_i$ of the traffic matrix are marked as processed
Results
    FTR is the feasible target routing sought
    Start the re-routing sequence . . .

Once the strategy has been calculated off-line on the network simulator the strategy is changed (in the form of order of the circuits to be moved and their new routing) to the conventional network re-routing procedures that will perform the calculated re-routing steps.

Essentially, this method produces a feasible target routing and a sequence of movements for reaching it starting from the actual routing, by means of a re-routing sequence of a single circuit at a time and with not more than one re-routing per circuit.

It should also be considered that if the resulting feasible target routing is different from the desired target routing it is possible that a second change through the method using the feasible target routing as new actual routing would lead to obtaining better results i.e. closer to the desired target routing.

The difference between the feasible target routing and the desired target routing (sum of the differences on all the circuits) is a significant parameter for deciding whether application of the method is useful on a given network with a given actual routing.

In any case, it must be noted that even a small change could enable more important changes in a subsequent passage of the method.

To better clarify the concepts of the method in accordance with the present invention a simple operational example is given below.

Figure 3:
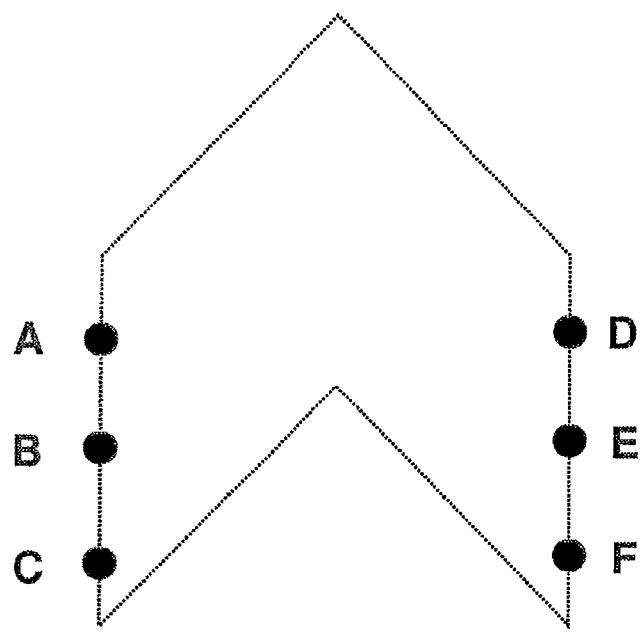
FIGS. 3 to 8 show the steps of the method applied to an example of a simple network.

Assume having a network like the one shown diagrammatically in FIG. 3. The 'space' of the possible connection circuits between the end points A-B-C and D-E-F is the one inside the perimeter of the dotted figure.

Figure 4:
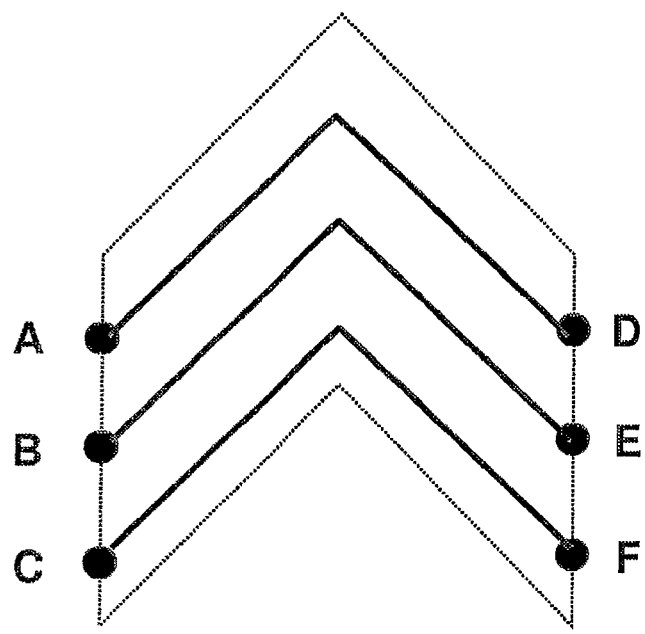

Let the traffic matrix be:

| $R_1$ | A-D |
| $R_2$ | B-E |
| $R_3$ | C-F | and the actual routing that satisfies this matrix be that shown in FIG. 4.

Figure 5:
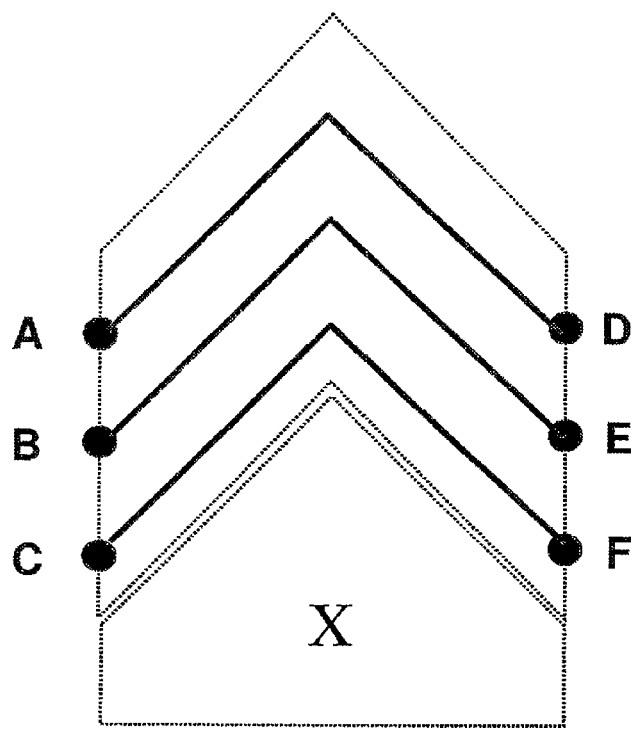

FIG. 5 shows diagrammatically a new situation in which new resources X are added to the network of FIG. 4. It would therefore be preferable to change to the more efficient routing shown in FIG. 6 obtained by straightening the circuits that satisfy the demands $R_1$, $R_2$, and $R_3$ of the traffic matrix. In other words, FIG. 6 shows the target routing.

Figure 6:
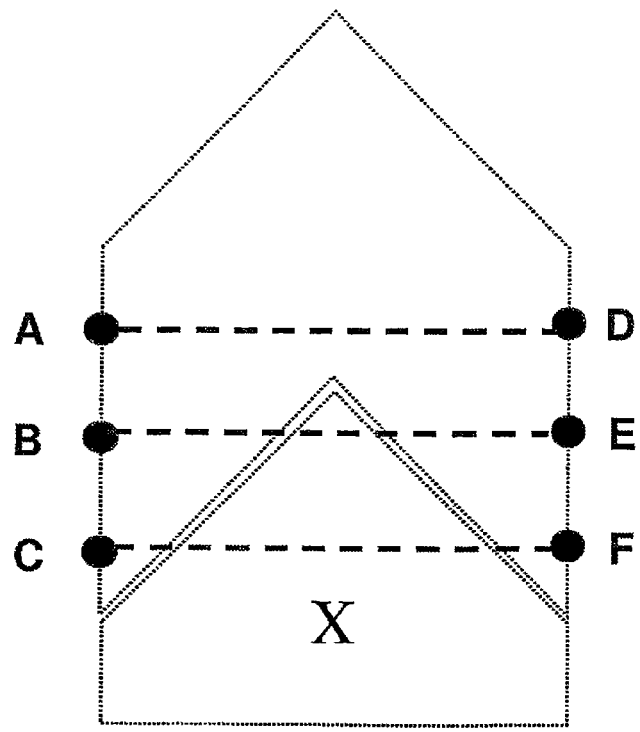

The problem is therefore to change from the situation of FIG. 4 to that of FIG. 6.

By applying the method of the present invention, the circuit that satisfies the demand $R_1$ in the actual routing is removed and the circuit that has the minimal cost difference from the target circuit is sought. In the example, it is seen that at the moment (FIG. 5) the only circuit that can replace the present circuit A-D that is removed is identical to the circuit removed. In other words, the cost difference is equal to the total cost of the removed circuit A-D.

Then the circuit that satisfies the demand $R_2$ in the actual routing is removed and the circuit that has the minimal cost difference from the target circuit is sought. The situation is identical to that faced for the demand $R_1$; the only circuit that can replace the present circuit B-E is identical to it and the cost difference is equal to the total cost of the removed circuit B-E.

The circuit of $R_3$ is removed last. Thanks to the new resources in X it is possible to replace the actual routing circuit with the target routing circuit and the cost difference is zero. The demand $R_3$ is marked as 'already considered' and the new circuit C-F is inserted in the re-routing list. The routing to be developed therefore becomes that of FIG. 7.

Since the demands are not all marked as considered, the external loop returns to the start of the internal loop.

Figure 7:
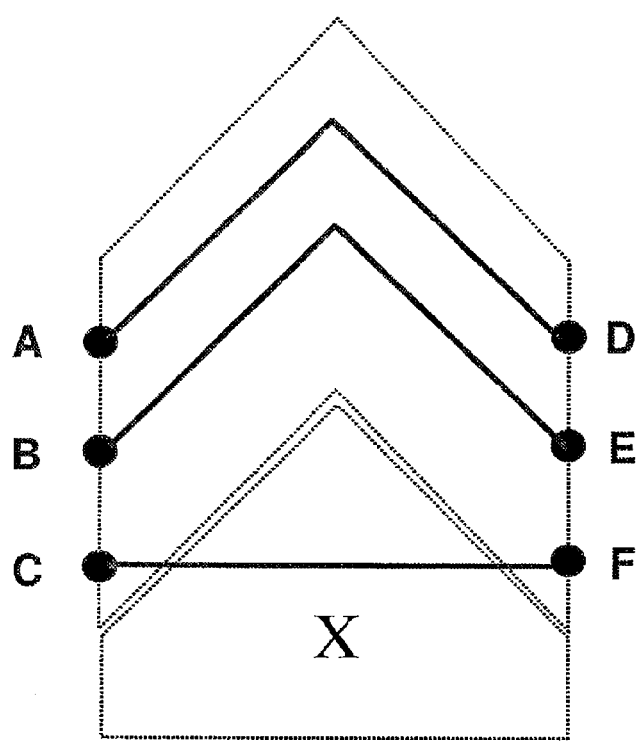

The internal loop starts over from the beginning with the new routing to be developed that is assumed equal to the routing with the new circuit for $R_3$ as shown in FIG. 7.

The circuit that satisfies the demand $R_1$ in the routing of FIG. 7 is therefore removed again. But the situation for $R_1$ is still the same as the preceding one (the only circuit that can replace the present one is identical to it and the cost difference is equal to the total cost of the removed circuit).

In the next step of the internal loop, in the routing of FIG. 7 the circuit of $R_2$ is then removed. Thanks to the fact that the circuit that satisfies $R_3$ is now that of FIG. 7, it is possible to replace the circuit of $R_2$ in the routing of FIG. 7 with the circuit of the target routing and the cost difference is zero. The demand $R_2$ is therefore marked 'already considered' and the new circuit B-E is inserted in the re-routing list.

Figure 8:
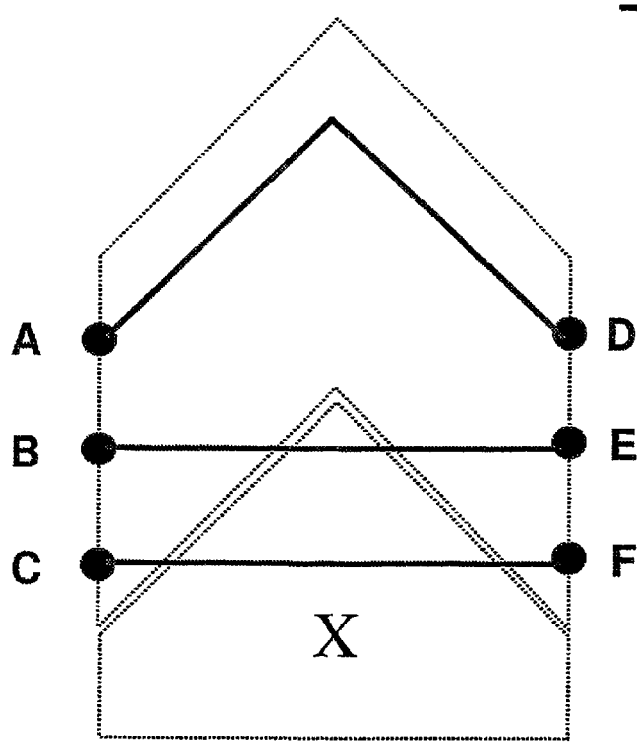

It is thus possible to restart the loop with the new routing to be developed that is assumed equal to the routing of FIG. 8.

The circuit that satisfies the demand $R_1$ in the routing of FIG. 8 is therefore removed again. Now the circuit can be replaced with that of the target routing. Therefore the demand $R_1$ is also marked 'already considered' and the new circuit A-D is inserted in the re-routing list. At this point all the demands are exhausted and thus the external loop is also terminated.

Since the feasible target routing that was found coincides with the desired target routing is not necessary, no new use of the method is necessary for seeking to improve the result further.

Diagrammatically, the calculated re-routing list or sequence that will be changed to the known re-routing routine of the network will be of the following type:
    First: 'straightens' C-F that satisfies R3;
    Second: 'straightens' B-E that satisfies R2; and
    Third: 'straightens' A-D that satisfies R1.

This list is changed and performed by the re-routing procedure of the network.

In a less fortunate case in which the feasible target re-routing does not coincide with the desired target re-routing, some data could advantageously be supplied for deciding whether the re-routing sequence is to be applied or not. For example, the more significant data can be the overall distance cost between the actual routing and the feasible target rerouting (cost that we might call 'practical improvement') and the overall distance cost between the feasible target re-routing and the desired target routing, a cost that we might call 'unobtainable improvement'.

For example, a good practical improvement is necessary to give real benefits. On the other hand, a poor practical improvement combined with a good 'unobtainable' improvement might appear as bad news but despite this a slight practical improvement might lower the poor conditioning of the network and allow greater improvement in a subsequent step and therefore counsel all the same making a new application of the method to the feasible target routing that was obtained.

The decision as to implementation or not should be left to a human operator with the capability of experimenting on the simulator with the support of a suitable documentation of the results.

It is now clear that the predetermined purposes have been achieved by making available a method allowing deciding the steps to be used to reach or in any case approximate as much as possible a predetermined target routing with minimal disturbance of the services in the network and minimum risks.

As mentioned above, the overall method in accordance with the present invention allows freely choosing different preferred routing algorithms, it being sufficient that only the target cost function be satisfied. In a dual manner, the method allows the routing algorithm to perform the choices for re-routing a large series of circuits in a controlled manner.

Naturally the above description of an embodiment applying the innovative principles of the present invention is given by way of non-limiting example of said principles within the scope of the exclusive right claimed here.

The invention claimed is:

1. A method for reconfiguring a telecommunications transport network after addition or removal of a network resource, the method comprising:
   identifying a sequence of single circuit movements to modify the network from a set of n actual circuits $CA_i$ (i=1, ..., n), each satisfying a corresponding demand $R_i$ to a set of feasible intermediate circuits $CI_i$ which continue to satisfy the demands $R_i$ and which best approximate a series of target circuits $CT_i$, comprising:
   (a) initializing, at a network simulator, the circuit set CI to CA;
   (b) for each demand $R_i$ still to be processed
      (i) calculating, at the network simulator, one or more candidate replacement circuits $CI_j$, each candidate replacement circuit $CI_j$ satisfying the demand $R_i$ and having a lower cost difference with respect to the corresponding target circuit $CT_i$ than the current circuit $CI_i$ satisfying the demand $R_i$;
      (ii) replacing, at the network simulator, the current circuit $CI_i$ with the candidate replacement circuit $CI_j$ having the least cost difference; and
      (iii) marking, at the network simulator, the demand $R_i$ as having been processed; and
   (c) identifying, at the network simulator, the sequence of single circuit movements with which circuits $CI_i$ were replaced as the series of single circuit movements to modify the network.

2. The method of claim 1 wherein each circuit comprises one or more legs connecting two or more nodes, and wherein calculating the cost difference of a candidate replacement circuit $CI_j$ with respect to the corresponding target circuit $CT_i$ comprises summing the costs of the legs of the circuit $CI_j$ that do not overlap with the legs of the target circuit $CT_i$.

3. The method of claim 2 wherein calculating the cost difference further comprises excluding a cost associated with an unused leg of the target circuit $CT_i$.

4. The method of claim 1 wherein the cost of a circuit is the sum of the cost of each circuit leg.

5. The method of claim 1 further comprising, after processing all demands $R_i$, determining whether to take the sequence with which circuits $CI_i$ have been replaced as the series of single circuit movements to modify the network, or whether to repeat step (b) using the current set of feasible intermediate circuits $CI_i$.

6. The method of claim 5 wherein the determination is made based on the overall difference in cost between the CA circuits and the CI circuits.

7. The method of claim 5 wherein the determination is made based on the overall difference in cost between the CI circuits and the CT circuits.

8. The method of claim 1 further comprising providing the identified sequence of single circuit movements to a network manager for implementation on the network.

9. The method of claim 8 further comprising performing the identified sequence of single circuit movements on a network by the network manager.

10. A telecommunications transport network comprising:
   a plurality of circuits that satisfy a corresponding plurality of demands R; and
   a network simulator operative to reconfigure the telecommunications transport network after addition or removal of a network resource by identifying a sequence of single circuit movements to modify the network by:
   (a) initializing a circuit set CI to CA, wherein CA comprises a set of n actual circuits $CA_i$ (i=1, ..., n), each satisfying a corresponding demand $R_i$, and wherein CI comprises a set of feasible intermediate circuits $CI_i$ which continue to satisfy the demands $R_i$ and which best approximate a series of target circuits $CT_i$;
   (b) for each demand $R_i$ still to be processed
      (i) calculating one or more candidate replacement circuits $CI_j$, each candidate replacement circuit $CI_j$ satisfying the demand $R_i$ and having a lower cost difference with respect to the corresponding target circuit $CT_i$ than the current circuit $CI_i$ satisfying the demand $R_i$;
      (ii) replacing the current circuit $CI_i$ with the candidate replacement circuit $CI_j$ having the least cost difference; and
      (iii) marking the demand $R_i$ as having been processed; and
   (c) identifying the sequence of single circuit movements with which circuits $CI_i$ were replaced as the series of single circuit movements to modify the network.

* * * * *

UNITED STATES PATENT AND TRADEMARK OFFICE
CERTIFICATE OF CORRECTION

| | | |
|---|---|---|
| PATENT NO. | : 7,990,876 B2 | Page 1 of 1 |
| APPLICATION NO. | : 10/597229 | |
| DATED | : August 2, 2011 | |
| INVENTOR(S) | : Fiaschi et al. | |

It is certified that error appears in the above-identified patent and that said Letters Patent is hereby corrected as shown below:

In Column 3, Line 27, delete "configure" and insert -- configuration --, therefor.

In Column 5, Line 13, delete "Replace" and insert -- Replace $Cl_i$ --, therefor.

In Column 8, Line 34, in Claim 10, delete "R;" and insert -- $R_i$; --, therefor.

Signed and Sealed this

Seventh Day of February, 2012

David J. Kappos
*Director of the United States Patent and Trademark Office*